Patented Nov. 22, 1932

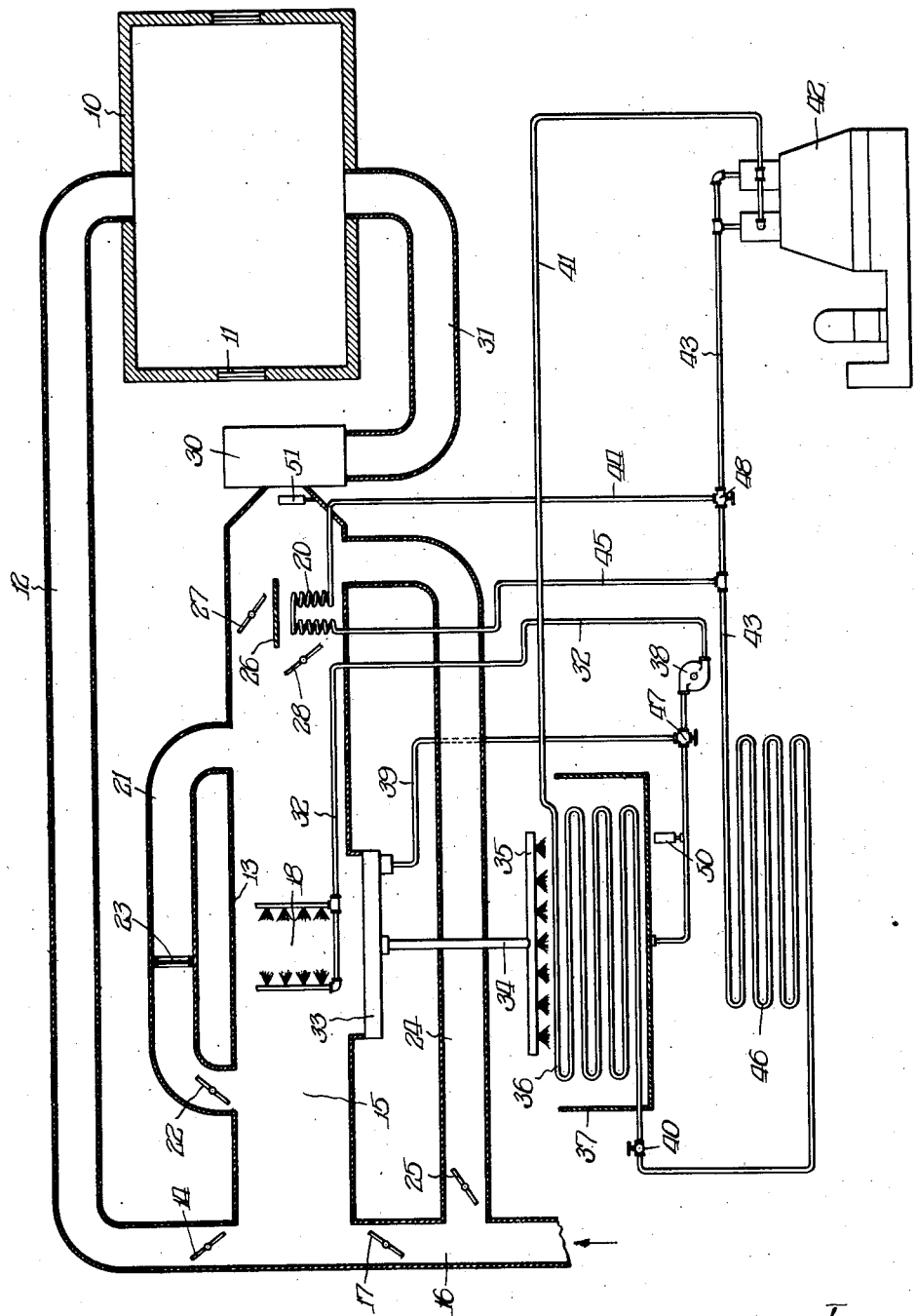

1,888,242

UNITED STATES PATENT OFFICE

STEPHEN SHOLTES, OF CHICAGO, ILLINOIS

REFRIGERATING AND VENTILATING SYSTEM

Application filed February 5, 1930. Serial No. 425,934.

The invention relates to mechanical cooling of artificial ventilated enclosures or buildings, such as assembly halls, theatres, public dining rooms and other enclosures, where people congregate in considerable numbers.

It has been found that in mechanically cooled and artificially ventilated enclosures the comfort of the occupants is dependant upon the purity of the air supply, its temperature, relative humidity and movement of the air. It is recognized that with the air of standard purity a relative humidity of about 50% and a temperature of 70° to 75° F. gives the most satisfactory comfort conditions.

In mechanical cooling and artificial ventilating systems heretofore designed for similar purposes, the total air supply passing through the same into the enclosure is generally composed of one-fifth part of fresh air drawn from the outside and four-fifths part of re-circulated air that is withdrawn from enclosure. These systems have also been designed so that the fresh air portion of the total air supply is passed through a dehumidifier, where its temperature and dewpoint are lowered to a predetermined degree. The re-circulated air without any change is returned to the enclosure after being mixed with a supply of fresh air. This mixing of the re-circulated air, which is of a higher temperature and a lower relative humidity than the air which passed through the dehumidifier, is carried out for the purpose of reheating the fresh air after it has passed through the dehumidifier in order that the air delivered to the enclosure may not be too cool or too humid for the comfort of the occupants. It is evident however, that no consideration has been given in these prior systems to the purity of the re-circulated air since the same is returned in its previous condition without any material purification except that obtained by the addition of the fresh air.

It is one of the primary objects of the present invention to provide a mechanical cooling and ventilating system in which the re-circulated air may be first mixed with a supply of fresh air and the whole passed through a dehumidifier and purified, both operations being accomplished immediately prior to returning the air to the enclosure. This results in absolutely pure air at the substantially constant temperature and proper relative humidity being supplied at all times to the enclosure.

It is a further object to provide a cooling and ventilating system having means for by-passing a portion of the mixed air and all or a portion of the fresh air supply around the dehumidifier so that more accurate regulation of the air may be obtained since the conditions of the fresh air supply vary in different localities as well as the purity of the re-circulated air. This feature of the invention allows the fresh air which in the summer time may have a temperature of about 90° F. to be used to reheat the purified and cooled re-circulated air.

A still further object is to provide practical and efficient apparatus for maintaining a pure air supply with a comfortable temperature and relative humidity and for supplying the same to assembly halls and like enclosures, which apparatus will be comparatively simple in construction and cheap to manufacture.

With these and various other objects in view, the invention may consist of certain novel features of construction and operation, as will be more fully described and particularly pointed out in the specification, drawing and claim appended hereto.

In the drawing, which illustrates an embodiment of the device and wherein like reference characters are used to designate like parts—

The figure is a diagrammatical illustration of the ventilating system of the present invention as applied to any form of enclosure.

In the drawing it will be noted that the present invention is associated with any conventional form of assembly hall, theatre or like enclosure 10, which is shown provided with a series of outlets 11, which may comprise windows, doors, etc. The air is conducted from the enclosure by a suitable duct 12 which is located at desired places throughout the same. The air withdrawn from the enclosure by the duct 12 is conducted to the cooling apparatus generally located on the roof or other parts of the building, which apparatus is located within a conduit or tunnel 13 of suitable size to house the cooling mechanism. For controlling the amount of air withdrawn from the enclosure, the duct 12 is provided with a damper 14. The mixing chamber 15 located in the front part of the conduit 13 is also directly connected to a duct 16 having connection with the outside for supplying the fresh air to the cooling apparatus. As a means for regulating this supply, the duct 16 is provided with a damper 17.

Located within the conduit 13 is a dehumidifier 18 and a series of heat exchangers 20, the purposes of which will be more fully explained. It is sometimes necessary, so as to secure accurate regulation of the air supplied to the enclosure, to pass a portion of the re-circulated and fresh air after mixing the same in the chamber 15 around the dehumidifier and for this reason the conduit 13 is provided with a by-pass 21. A damper 22 allows regulation of the amount of air by-passing the dehumidifier, while a filter 23 serves to remove dust, bacteria and other physical impurities from the air. In localities where it is found possible to use artesian well water for the dehumidifier it is desirable to reheat the air after passing through the dehumidifier by fresh air from the outside, since in the summer time this air may have a temperature of 90° F. or more. For this purpose the conduit 13 is provided with another by-pass 24, having a damper 25 for supplying the required amount of fresh air from the conduit 16 directly to the rear end of the conduit 13, thus passing the air around both the dehumidifier 18 and the heat exchangers 20, although by-passing the air around the latter mechanism is optional. A baffle plate 26 located adjacent the heat exchanger 20 and dampers 27 and 28 serves to allow accurate regulation and control at all times of the volume of air passing around the heat exchangers or passing through them. At the rear end of the conduit 13 a power driven fan 30 is located providing the means for withdrawing the air from the enclosure by way of the duct 12 and for forcing the air after purification through the duct 31 back into the enclosure again. It may be noted that the enclosures being provided with doors and windows allows escape of a considerable quantity of air which requires the addition of air to the withdrawn air to balance the supply.

The dehumidifier 18 comprises the conventional form of spray apparatus, being provided with a supply pipe 32, supplying the same with water or brine as desired. Located below the dehumidifier 18 is a sump tank 33 for collecting the spray water and conducting the same through pipe 34 into an overhead spray apparatus 35. The water or brine after passing through the dehumidifier is thus collected in the apparatus 35 and allowed to flow over a series of evaporating coils 36, which serve to cool the water whereupon it is collected and stored for further use in the sump tank 37. A pump 38 is provided to draw the water from the sump tank 37 as desired and return the same to the supply pipe 32, where the operation upon the water is again repeated. It is sometimes desirable to return the water directly to the dehumidifier without cooling the same and therefore the sump tank 33 has connection with a by-pass pipe 39, which conducts the water around the evaporating coils directly to the pump 38.

The refrigerating system is of the usual type commonly associated with cooling systems of the type described and comprises an expansion valve 40 whereby the refrigerant gas is expanded and results in the well known cooling effect as the gas is conducted through the evaporating coils 36 which serves to maintain the brine or water for the dehumidifier 18 at a low temperature. From the evaporating coils 36 which serves to maintain the brine or water for the dehumidifier 18 at a low temperature. From the evaporating coils 36 the refrigerant gas is conducted through pipe 41 to the compressor 42. For the purposes of the present invention the compressor is preferably of the reciprocating type although the same may be embodied in the centrifugal or rotary types as described. The refrigerant gas after leaving the compressor 42 is conducted by way of pipe 43 and pipe 44 to the heat exchangers 20. It is of course understood that the gas after passing through the compressor is of an extremely high pressure and therefore at a high temperature due to the work done upon it. By conducting the gas through the heat exchangers, it is forced to give up a portion of this heat to the purified air which is passed through the heat exchangers by reason of the structure described in connection with the conduit 13. From heat exchangers the gas is conducted by pipe 45 to pipe 43 again and thence through a series of coils comprising the condenser 46. The condenser serves to remove the remaining heat from the refrigerant gas during which time it is transformed as is well known in refrigerating systems, into its liquid form again. As a means for regulating the supply of water or brine to the dehumidifier as well as the compressed gas to the heat exchangers 20, the apparatus is provided with a three-way valve 47 and 48 respectively. Also in like manner the temperature of the water being supplied to the dehumidifier is controlled by a thermostat 50, while the temperature and dewpoint of the purified air passing into the fan 30 is determined by dewpoint instrument 51 of any suitable type.

The air withdrawn from the enclosure 10 is conducted by the passage 12 into the mixing chamber 15 where it is mixed with the correct amount of fresh air supplied from the passage 16. In full operation of the apparatus the total amount of re-circulated air as well as the fresh air supply would be forced through the dehumidifier 18, which by reason of the water or brine spray, the air would be purified and its temperature and moisture content considerably lowered. The range of temperature of this air after passing the dehumidifier is from 50° to 55° F., which as is well known is much too low in temperature to supply the same directly to the enclosure. For reheating this purified air, the heat exchangers 20 and the by-pass 24 are provided, the latter functioning to bypass warm air around the dehumidifier to raise the temperature of the purified air and to regulate its relative humidity to that degree commensurate with the comfort requirements of the occupants for other purposes of the enclosure. This correspondingly results in a substantial decrease in the cost of maintaining and operating the cooling system.

By operation of the system of dampers 27 and 28, the purified air can be passed through the heat exchangers 20 or passed around them as required after which the air is supplied by the fan 30 to the enclosure by way of the passage 31. For the purposes of the present invention the regulation of the several dampers may be effected manually or automatically by connection with thermostats or by electric power, according to customary practice.

It is also possible by reason of the structure of the present invention to supply artesian well water to the dehumidifier 18 and as this water is generally of a low temperature the refrigerating system for cooling the same can be eliminated. Where this is possible the entire fresh air can be conducted through the passage 24 directly into the conduit 13 and as this air will have a temperature around 90 degrees it will have the effect of raising the temperature of the purified air to that desired.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claim.

I claim:

In a mechanically cooled ventilating system, in combination with an enclosure, a conduit, a passage for conducting air from the enclosure to the conduit, a passage for conducting fresh air to the conduit, a dehumidifier located within the conduit, a by-pass in said conduit for passing a portion of the mixed air in the conduit around the dehumidifier, and a second by-pass for conducting the fresh air to the conduit by passing the same around the dehumidifier.

Signed at Chicago, Illinois, this 31st day of January, 1930.

STEPHEN SHOLTES.

CERTIFICATE OF CORRECTION.

Patent No. 1,888,242.                                                      November 22, 1932.

STEPHEN SHOLTES.

It is hereby certified that error appears in the printed specification of the above numbered patent requiring correction as follows: Page 2, lines 94 to 97, inclusive, strike out the words "From the evaporating coils 36 which serves to maintain the brine or water for the dehumidifier 18 at a low temperature."; and that the said Letters Patent should be read with this correction therein that the same may conform to the record of the case in the Patent Office.

Signed and sealed this 7th day of February, A. D. 1933.

(Seal)                                                            M. J. Moore,
Acting Commissioner of Patents.